United States Patent
Katzarov et al.

(10) Patent No.: US 11,845,050 B2
(45) Date of Patent: Dec. 19, 2023

(54) SYSTEM AND METHOD FOR PRODUCING A MIXTURE OF LIQUIDS

(71) Applicant: Henkel AG & Co. KGaA, Duesseldorf (DE)

(72) Inventors: Jordan Katzarov, Duesseldorf (DE); Adrian Schmitz-Le Hanne, Berlin (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 848 days.

(21) Appl. No.: 16/646,878

(22) PCT Filed: Aug. 31, 2018

(86) PCT No.: PCT/EP2018/073467
§ 371 (c)(1),
(2) Date: Mar. 12, 2020

(87) PCT Pub. No.: WO2019/052838
PCT Pub. Date: Mar. 21, 2019

(65) Prior Publication Data
US 2020/0276546 A1    Sep. 3, 2020

(30) Foreign Application Priority Data
Sep. 14, 2017   (DE) ..................... 10 2017 216 336.4

(51) Int. Cl.
*B01F 25/00* (2022.01)
*B01F 33/84* (2022.01)
(Continued)

(52) U.S. Cl.
CPC .......... *B01F 33/8442* (2022.01); *A45D 44/00* (2013.01); *B01F 23/47* (2022.01);
(Continued)

(58) Field of Classification Search
CPC .. B01F 33/8442; B01F 2101/21; B01F 23/47; B01F 35/717611; A45D 2044/007; A45D 44/00; G06F 16/9035
See application file for complete search history.

(56) References Cited

U.S. PATENT DOCUMENTS 6,254,269 B1    7/2001 Ernstson et al.
7,445,372 B1   11/2008 Engel et al.
(Continued)

FOREIGN PATENT DOCUMENTS

DE        69719995 T2    9/2003
DE    102006049054 A1    4/2008
(Continued)

OTHER PUBLICATIONS

EPO, International Search Report issued in International Application No. PCT/EP2018/073467, dated Mar. 28, 2019.

*Primary Examiner* — Anshu Bhatia
(74) *Attorney, Agent, or Firm* — Lorenz & Kopf, LLP

(57) ABSTRACT

A system and a method for generating a liquid mixture are provided. The system may comprise: a plurality of reservoirs, wherein the reservoirs are configured to hold a plurality of viscous liquids; at least one mixing device, wherein the mixing device is configured to mix at least two liquids from the plurality of reservoirs, and wherein the mixing device includes a static mixer; a plurality of peristaltic pumps configured to deliver the liquids from the reservoirs to the mixing device; at least one electronic system, wherein the electronic system is configured to receive at least one user-specific information regarding a mixing ratio of the at least two liquids from a computer app on at least one mobile device, and wherein the system is configured to mix the at least two liquids according to the predefined mixing ratio by employing the plurality of peristaltic pumps and the static mixer.

7 Claims, 4 Drawing Sheets

(51) Int. Cl.
  *G06F 16/9035* (2019.01)
  *A45D 44/00* (2006.01)
  *B01F 23/47* (2022.01)
  *B01F 25/42* (2022.01)
  *B01F 35/83* (2022.01)
  *B01F 35/71* (2022.01)
  *H04W 4/80* (2018.01)
  *B01F 101/21* (2022.01)

(52) U.S. Cl.
  CPC ...... *B01F 25/42* (2022.01); *B01F 35/717611* (2022.01); *B01F 35/831* (2022.01); *G06F 16/9035* (2019.01); *A45D 2044/007* (2013.01); *B01F 2101/21* (2022.01); *H04W 4/80* (2018.02)

(56) References Cited

U.S. PATENT DOCUMENTS

| | | |
|---|---|---|
| 8,593,634 B1 | 11/2013 | Igarashi |
| 2002/0026148 A1* | 2/2002 | Uber, III ............ A61M 5/16827 |
| | | 604/247 |
| 2014/0039447 A1* | 2/2014 | Wright ................... A61M 1/30 |
| | | 604/67 |
| 2015/0021356 A1 | 1/2015 | Witchell et al. |
| 2016/0143408 A1 | 5/2016 | L'Oréal |
| 2017/0208920 A1 | 7/2017 | Thiebaut et al. |
| 2017/0228892 A1 | 8/2017 | Nichol et al. |
| 2017/0246602 A1* | 8/2017 | Dean ................... B01F 35/2205 |

FOREIGN PATENT DOCUMENTS

| | | |
|---|---|---|
| EP | 1184071 A1 | 3/2002 |
| EP | 1245269 A1 | 10/2002 |
| JP | 2002119839 A | 4/2002 |
| JP | 2002284618 A | 10/2002 |
| JP | 2015531272 A | 11/2015 |
| WO | 2016057294 A1 | 4/2016 |
| WO | 2016086016 A1 | 6/2016 |
| WO | 2016125027 A1 | 8/2016 |

* cited by examiner

SYSTEM AND METHOD FOR PRODUCING A MIXTURE OF LIQUIDS

CROSS-REFERENCE TO RELATED APPLICATION

This application is a U.S. National-Stage entry under 35 U.S.C. § 371 based on International Application No. PCT/EP2018/073467, filed Aug. 31, 2018, which was published under PCT Article 21(2) and which claims priority to German Application No. 10 2017 216 336.4, filed Sep. 14, 2017, which are all hereby incorporated in their entirety by reference.

TECHNICAL FIELD

The present disclosure concerns a system and a method for producing a liquid mixture.

BACKGROUND

In many areas of daily life, there is a continuing trend towards personalized programs that address the individual requirements and needs of a customer or user. This is the case, for example, in the areas of nutrition or health care and also in the field of personalized cosmetics. This enables the consumer or user of cosmetic treatment products to receive individual treatment instructions and cosmetic treatment products that are specifically tailored to the individual needs of, for example, his or her hair, skin or teeth, thus enabling a particularly high degree of effectiveness.

Untrained hairdressers often lack experience in dealing with damaged hair. For example, it is difficult for young hairdressers to find out which hair treatment products are suitable for which customer in the hairdressing salon and in which proportions cosmetic treatment products such as shampoo, conditioner, hair treatment or hair dye have to be mixed optimally for a certain customer or to select a hair treatment product that is optimally designed to the condition of the hair. It is therefore a particular challenge for the hairdresser to achieve the hair colorings effect desired by the customer in the case of an existing hair damage of a customer. It is also difficult for the user who buys cosmetic treatment products and applies the cosmetic treatment products himself, for example at home, to achieve an exact mixing ratio, for example of hair treatment products or hair coloring components.

For example, a customer's or user's degree of hair damage is assessed subjectively, for example visually, and often based on the subjective assessment of the hairdresser or the customer a cosmetic treatment product is chosen which is not optimally suited to the individual needs of the user's hair.

For example, manually mixing different hair treatment products, such as components for a shampoo, conditioner, hair treatment or hair dye, is a challenge for the hairdresser or the user himself. An optimal mixing result can only be achieved if the individual components are mixed exactly in their predefined proportions. When manually mixing several cosmetic components from bottles, for example, a portion of one component may remain in the bottle excessively, so that the mixture may lack a portion of the one component.

BRIEF SUMMARY

This disclosure provides a system for producing a liquid mixture, comprising:

a plurality of reservoirs, wherein the reservoirs are configured to hold a plurality of viscous liquids;
at least one mixing device, wherein the mixing device is configured to mix at least two liquids from the plurality of reservoirs, and wherein the mixing device comprises a static mixer;
a plurality of peristaltic pumps, wherein the peristaltic pumps are configured to deliver the liquids from the reservoirs to the mixing device;
at least one electronic system, wherein the electronic system is configured to receive at least one piece of user-specific information regarding a mixing ratio of the at least two liquids from a computer application on at least one mobile device, and
wherein the system is configured to mix the at least two liquids according to the mixing ratio by employing the plurality of peristaltic pumps and the static mixer.

This disclosure also provides a method for producing a liquid mixture, the method comprising:

determining an individual mixture ratio of at least two liquids of a plurality of liquids based on at least one user-specific information stored in a database;
transporting at least two liquids of a plurality of liquids from a plurality of reservoirs to a mixing device based on the determined individual mixing ratio of a plurality of pumping devices; and
mixing the at least two liquids of a plurality of liquids by employing the plurality of pumping devices and the static mixer in such a way that the liquids are mixed according to the predefined mixing ratio.

BRIEF DESCRIPTION OF THE DRAWINGS

The present disclosure will hereinafter be described in conjunction with the following drawing figures, wherein like numerals denote like elements, and.

There indicate

DETAILED DESCRIPTION

Figure 1:
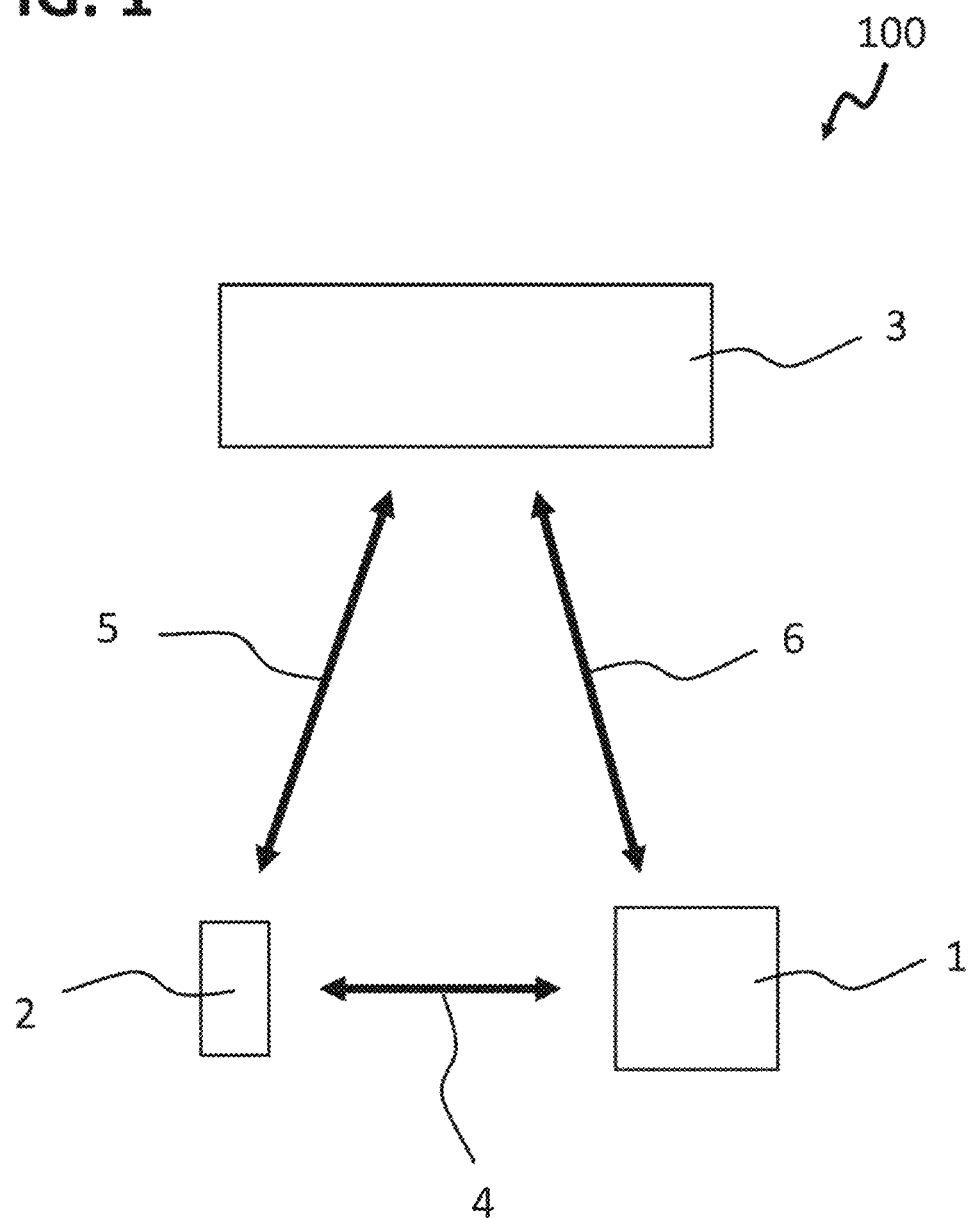
FIG. 1 is a schematic illustration of a system for producing a liquid mixture according to various exemplary embodiments.

The following detailed description is merely exemplary in nature and is not intended to limit the disclosure or the application and uses of the subject matter as described herein. Furthermore, there is no intention to be bound by any theory presented in the preceding background or the following detailed description.

In the following detailed description, reference is made to the attached drawings which form part of the present application and in which, by way of illustration, specific exemplary embodiments, in which the disclosure can be realized are shown.

The following detailed description is therefore not to be understood in a restrictive sense and the scope of protection of the present disclosure is defined by the attached claims.

The determination of an individual mixing ratio of cosmetic treatment products may be of great importance for a user and may be an important parameter for the user to assess his hair condition in an objective or standardized way.

It may also be desirable that a mixture of different cosmetic products can be carried out quickly. It may also be desirable that several cosmetic products should be mixed quickly one after the other under the same conditions. This may be the case, for example, in a hairdressing salon, where several customers are to be treated one after the other, for example with a hair care or hair dye.

It is also desirable to be able to maintain a standard of hygiene when mixing at least two components.

When treating a user's hair, it may be desirable to be able to draw on information or experience collected or archived during a previous treatment of another or the same user's hair with a cosmetic hair treatment product, for example as information or data on a server or cloud.

It may also be appropriate to allow the hairdresser or the user to access a cosmetic consultation system from his or her smart device, for example his or her smartphone or tablet, for example from home or even on holiday.

In order to be able to respond to the individual needs of the customer, a holistic ecosystem is known, comprising intelligent devices, by employing which it is possible to detect problems in the field of cosmetics (analysis), to provide consultation systems (evaluation, assessment) up to the determination and provision of the desired benefit/advantage (product), for example an improved hair or skin condition and/or a desired target hair color.

Furthermore, it may be appropriate to mix or prepare a cosmetic treatment product individually, for example on site, i.e. in a hairdressing salon, in a beauty salon or at a point of sale of cosmetic treatment products, such as a drugstore, by employing a smart mixer.

There is therefore a demand for a system which is able to provide an individual body treatment product, in particular a skin or hair treatment product, to a user in a standardized, objective and mobile way at a predetermined location.

There is also a demand for a system which is part of a personalized cosmetic advice system and/or is connected to a personalized cosmetic advice system in order to be able to access individual data stored in a memory or historical data or data from other users.

Furthermore, the system may enable the user to mix cosmetic treatment products specifically for the individual condition, for example his hair or his skin, or to produce cosmetic treatment products from individual cosmetic products and make them available at any desired location.

In various exemplary embodiments a system for generating a liquid mixture can be provided, comprising: a plurality of reservoirs, wherein the reservoirs are designed to hold a plurality of viscous liquids; at least one mixing device, wherein the mixing device is designed to mix at least two liquids from the plurality of reservoirs, and wherein the mixing device comprises a static mixer; a plurality of peristaltic pumps, wherein the peristaltic pumps are designed to deliver the liquids from the reservoirs to the mixing device; and at least one electronic system, wherein the electronic system is designed to receive at least one user-specific information regarding a mixing ratio of at least two liquids from a computer app on at least one mobile device, and wherein the system is designed to mix the at least two liquids according to the predefined mixing ratio by employing the plurality of peristaltic pumps and the static mixer.

In various exemplary embodiments a system can be provided, in which a suction distance of the liquids between at least one of a plurality of reservoirs and a respective associated peristaltic pump of a plurality of peristaltic pumps is designed in a predefined minimum possible range.

In various exemplary embodiments a system can be provided in which the static mixer is further designed to have a length in the range of from about 30 mm to about 90 mm, preferably from about 35 to about 70 mm.

In various exemplary embodiments a system can be provided, in which the mixing device is further designed to comprise a mixing tube, wherein the mixing tube is designed to receive the static mixer with at least four inner elements offset towards each other and/or inner elements twisted by about 180 degrees towards each other and/or wherein the inner elements are designed offset by about 90 degrees towards a previous or adjacent inner element.

In various exemplary embodiments a system can be provided, in which the mixing device is further designed to mix a plurality of laminar non-Newtonian fluids and/or wherein the laminar non-Newtonian fluids comprise at least one source material of a shampoo, conditioner, deep conditioner or hair dye.

In various exemplary embodiments a system can be provided, comprising a wireless data transmission connection for communication between the electronic system and the mobile device.

In various exemplary embodiments a system can be provided, in which the user-specific information comprises at least one item of information relating to an individual mixing ratio of at least two liquids for the production of a cosmetic treatment agent and/or comprises information relating to a delivery rate of at least one peristaltic pump of a plurality of peristaltic pumps suitable for the cosmetic treatment agent and/or wherein the information is stored in an external database.

In various exemplary embodiments a system can be provided, in which the system is further designed to determine the mixing ratio of the liquids based on at least one previously stored user-specific information in a database.

In various exemplary embodiments a system can be provided, wherein the plurality of peristaltic pumps are further designed to be coupled to the mixing device by employing fluid lines of equal length.

In various exemplary embodiments a system can be provided, wherein the mixing device is further designed to perform a cleaning operation, wherein in the cleaning operation a small amount of a liquid from a reservoir cleans the static mixer.

In various exemplary embodiments a system can be provided, wherein the mixing device is a hermetically sealed mixing device.

In various exemplary embodiments a system can be provided, in which a hermetically sealed mixing device may be exemplified in that an interior of the mixing device is not in contact with an exterior of the mixing device, i.e. it can be avoided that, for example, air and/or impurities can enter the mixing device from the outside. In other words, the mixing device may be sealed to an environment according to various exemplary embodiments.

In various exemplary embodiments a system can be provided, where the system is designed that an individual treatment agent can be reordered for at least one customer based on the at least one user-specific information. The customer can, for example, trigger the reorder online from home. The customer can then have the individual treatment agent sent, for example, to him or her by the hairdresser where he or she is a customer, or the customer can pick up the individual treatment agent at the place of manufacture, such as the hairdressing salon. Alternatively, the reorder can be initiated at the place of manufacture, for example the hair salon, using the computer app, and the customer takes the individual treatment product with him/her immediately.

In various exemplary embodiments a method for generating a liquid mixture can also be provided, comprising: determining an individual mixing ratio of at least two liquids of a plurality of liquids based on at least one user-specific information stored in a database; transporting at least two liquids of a plurality of liquids from a plurality of reservoirs to a mixing device based on the determined individual mixing ratio by employing a plurality of pumping devices; and mixing the plurality of liquid agents of the plurality of pumping devices and a static mixer such that the at least two liquids are mixed according to the set predefined mixing ratio.

In various exemplary embodiments a method can be provided, in which determining an individual mixing ratio further comprises receiving from the database the information regarding the individual mixing ratio and/or regarding at least one flow rate of one of a plurality of peristaltic pumps used for mixing by employing a computer app on a mobile device and/or by employing a data transmission connection between the mobile device and the database.

In various exemplary embodiments a method can be provided, in which the determination of the mixing ratio further comprises a determination of the individual mixing ratio based on at least one previously determined user-specific information stored in the database and/or in which the information comprises at least one information concerning a composition of a shampoo, conditioner, deep conditioner or hair dye.

Various exemplary embodiments make it possible to provide a system comprising a smart mixer capable of precisely providing personalized deep conditioners or hair treatment agents such as a shampoo, conditioner and/or hair dye to a hairdresser and/or a user.

Various exemplary embodiments represent a system, which can simplify the production of cosmetic treatment products and can optimize the production of a cosmetic treatment product designed for a user, for example by mixing different source products.

In various exemplary embodiments the system can increase the satisfaction of at least one user with a hair treatment product.

In various exemplary embodiments the system can increase hygiene in the field of cosmetic treatment products, for example by mixing at least two liquids in the production of a cosmetic treatment product.

In various exemplary embodiments the system can contribute to the independence of a user of the system from the opening hours of cosmetic consultation systems or a hairdressing salon, etc.

In various exemplary embodiments the system provides a system that enables an individual cosmetic treatment product to be produced and provided quickly, preferably in less than one hour and more preferably in less than about 15 minutes.

Various exemplary embodiments provide a system that is mobile.

Various exemplary embodiments provide a system that makes it possible to produce several mixtures quickly and precisely one after the other.

Various exemplary embodiments provide a system that makes it possible to increase the economic efficiency of mixing cosmetic treatment products by reducing the amount of liquid wasted or lost during mixing.

Various exemplary embodiments provide a system that enables a lower total power consumption to be achieved when mixing at least two liquids.

Various exemplary embodiments provide a system that is built from a few non-complex components.

Various exemplary embodiments provide a system whose components, in particular the mixing device and the reservoir, can be easily exchanged.

Various exemplary embodiments provide a system that can enable a high degree of accuracy in the production of cosmetic treatment products by mixing at least two liquids.

Various exemplary embodiments provide a system that makes it possible to adapt the composition of an individual treatment product to the current hair and/or skin condition, especially to the degree of internal hair damage, of the user.

Various exemplary embodiments provide a system that can be easily operated by the hairdresser or the user.

Various embodiments may provide a system that is connected to a holistic ecosystem in the field of cosmetic product consultation by employing a link or can encompass a holistic ecosystem.

Various embodiments may provide a system in which the system can receive user-specific information or individually tailored compositions of cosmetic treatment products or mixing ratios of at least two liquids for the preparation of cosmetic treatment products from a holistic ecosystem.

Various embodiments may provide a system that further comprises a sensor, for example a camera or an infrared sensor for detecting characteristics of a customer's hair or skin, by employing which individual customer-specific information can be collected and/or the sensor is in communication with a holistic ecosystem and the system for producing a liquid mixture, for example by employing a wired or wireless data transmission connection.

Various embodiments may provide a system that can access a plurality of data in a holistic ecosystem.

Various embodiments may provide a system, which, by employing a database, may be able to calculate or determine at least one personalized mixing ratio of at least two liquids of a plurality of liquids, each containing at least one ingredient of a cosmetic treatment product for a cosmetic treatment product.

Various embodiments may provide a system, in which electronics may be able to receive and/or determine a user-specific mixing ratio of at least two liquids of a plurality of liquids for the production of a cosmetic treatment agent based on at least one user-specific information.

Various exemplary embodiments provide a system, which may comprise at least one of a casing, electronics, a plurality of reservoirs, for example bags or cartridges, for storing liquids, at least one connection or pipe or line, a plurality of pumps, a user interface, a printer, a mixing device or mixer, at least one container for receiving a mixture of liquids, at least one device for receiving or collecting waste, for example a waste container, a data transmission connection, for example a wired or wireless data transmission connection.

Various exemplary embodiments provide a system, in which a connection or an exchange of information or data can be realized by employing a wired connection, for example Ethernet, or by employing a wireless data transmission connection, for example Bluetooth, GSM, ZigBee, Thread, LTE, 3G, NFC or Wi-Fi.

Various exemplary embodiments provide a system in which a device for wireless data transmission, for example a Bluetooth device or Wi-Fi device, may not be fully integrated in a casing if the casing comprises a metal body. For example, in various exemplary embodiments the casing may include a window, for example of plastic, under which a device for wireless data transmission is located.

Various exemplary embodiments provide a system, in which a casing can be provided which may comprise components of the system and/or represent a brand.

Various exemplary embodiments provide a system, in which electronics are intended to control or regulate electrical components of the system.

Various exemplary embodiments provide a system, in which the liquids each comprise at least one ingredient of a cosmetic treatment product and the liquids differ from one another in the type of ingredients or in the concentration of the ingredients.

In various exemplary embodiments a system can be provided, in which a target container, into which an already mixed liquid mixture is introduced after mixing, is empty before being filled with the mixed liquid mixture.

In various exemplary embodiments a system can be provided, in which viscous liquids, for example source materials for shampoos, conditioners, deep conditioners or hair dyes, can be processed.

In various exemplary embodiments a system can be provided, in which liquids with different viscosity, for example low viscosity liquids up to viscous liquids such as creams, can be processed without having to change the structure.

In various exemplary embodiments a system can be provided, in which liquids are stored airtight in large quantities in reservoirs for processing in the system.

In various exemplary embodiments a system can be provided, in which a mixture of liquids can be realized by employing a nested pump system and a predefined static mixing device.

In various exemplary embodiments a system can be provided, which makes it possible to dispense with additional mixing devices, for example a large mixing container, which must be rotated to mix the liquids in it.

In various exemplary embodiments a system can be provided, which makes it possible that a system can be realized in a small space.

In various exemplary embodiments a system can be provided, which can be realized as a portable mixing system. Preferably the system can be moved by one person.

In various exemplary embodiments a system can be provided, which may include few moving parts. In various exemplary embodiments a system can, for example, include moving components only in a number of pumps, for example peristaltic pumps. In various exemplary embodiments a system can be provided, which can do without a large number of complex mechanical components for transporting and mixing liquids for the manufacture of cosmetic treatment products.

In various exemplary embodiments a system can be provided, in which high reliability can be achieved. In various exemplary embodiments a system can be provided, in which one peristaltic pump of the plurality of peristaltic pumps can be easily replaced.

In various exemplary embodiments a system can be provided, in which a plurality of peristaltic pumps can be positioned directly at the associated reservoirs. In other words, according to various exemplary embodiments, a short distance or a short tube section can be provided between the plurality of peristaltic pumps and the associated reservoirs. In various exemplary embodiments a system can be provided that can enable a precise flow rate of one peristaltic pump or a plurality of peristaltic pumps to be achieved.

In various exemplary embodiments a system can be provided, which makes it possible to dispense with rapidly rotating mixing containers, which can generate imbalance and/or vibration, for mixing liquids.

In various exemplary embodiments a system can be provided in which fast rotating mixing devices can be dispensed with, which could possibly lead to damage to a mixed material such as liquids.

In various exemplary embodiments a system can be provided, in which a precisely working system and/or a hygienically working system can be provided by employing the plurality of peristaltic pumps, in which, for example, pump valves for controlling the liquid flow can be dispensed with.

In various exemplary embodiments a system can be provided, in which a reservoir can hold, for example, components of shampoos, conditioners, deep conditioners or hair dyes.

In various exemplary embodiments a system can be provided, in which at least one connection, for example a tube or hose, can be provided, the tube or hose being designed to connect, for example, an interior of at least one reservoir to a mixing device.

In various exemplary embodiments a system can be provided, in which at least one peristaltic pump can precisely convey a flow of a liquid from at least one reservoir and can drive a flow of at least one liquid in a tube or hose.

In various exemplary embodiments a system can be provided, in which at least two large peristaltic pumps and at least two, preferably at least four and quite preferably at least eight, small peristaltic pumps are provided to take viscous liquids from respective individual reservoirs and to feed the ingredients separately to a mixing device. In various exemplary embodiments a system can be provided in which the plurality of peristaltic pumps may comprise for example about 25, about 40 or about 128 peristaltic pumps. Accordingly, the number of reservoirs and liquids may, for example, also be about 25, about 40 or about 128.

In various exemplary embodiments a system can be provided, in which at least one large peristaltic pump can have a flow rate in a range of from about 50 to about 200 ml/minute, preferably about 100 ml/minute.

In various exemplary embodiments a system can be provided, in which at least one small peristaltic pump can have a flow rate in a range of from about 5 to about 20 ml/minute, preferably about 10 ml/minute.

In various exemplary embodiments a system can be provided, in which the preferred flow rates allow a mixing of a plurality of viscous liquids with an error rate or inaccuracy of not more than about 5% to be enabled.

In various exemplary embodiments a system can be provided, in which a plurality of peristaltic pumps can deliver liquids synchronously or approximately simultaneously and/or in equal quantities in a predefined ratio.

In various exemplary embodiments a system can be provided, in which each peristaltic pump is connected to its own reservoir.

In various exemplary embodiments a system can be provided, which, by employing a peristaltic pump, can make it possible to provide a completely closed system with smooth surfaces and/or good sterilizability.

In various exemplary embodiments a system can be provided that cannot provide additional valves besides peristaltic pumps.

In various exemplary embodiments a system can be provided that may include a peristaltic pump that can provide a gentle delivery of sensitive material (liquids) compared to pumps with fast rotating propeller blades.

In various exemplary embodiments a system can be provided, which can include peristaltic pumps, which can enable a very small and/or exact flow rate of a liquid.

In various exemplary embodiments a system can be provided, which comprises a plurality of peristaltic pumps with the ability to provide a smooth, relatively shock-free delivery compared to other positive displacement pumps.

In various exemplary embodiments a system can be provided, which comprises two large and eight small peristaltic pumps.

In various exemplary embodiments a system can be provided, in which the plurality of peristaltic pumps can take the viscous liquids from at least one respective reservoir and, for example, press them into a target bottle to be filled.

In various exemplary embodiments a system can be provided, in which the plurality of peristaltic pumps can be electrically controlled or regulated.

In various exemplary embodiments a system can be provided, in which an exact or precise pump volume or supply can be realized by employing a number of revolutions of a respective pump wheel.

In various exemplary embodiments a system can be provided, in which a number of peristaltic pumps can be used to deliver non-Newtonian fluids.

In various exemplary embodiments a system can be provided, which by employing a plurality of peristaltic pumps and a static mixing device is designed to press a liquid flow away from the pumps into the static mixing device at a predefined operating pressure, wherein a viscous liquid sucked by a pump changes into a thin liquid during the pumping through the static mixing device and after the mixing process resumes its original viscous state.

Various exemplary embodiments provide a system where a user interface can be provided to facilitate machine-user interaction.

Various exemplary embodiments provide a system, in which a user interface can be provided for interaction between the system and the hairdresser or user by employing at least one control button and/or at least one lamp, for example an LED.

In various exemplary embodiments the system has no user interface.

Various exemplary embodiments provide a system where a printer can be provided that can print personalized labels for target containers, which can be applied to the target containers, for example manually or automatically, and/or print personalized lettering or graphics directly on target containers. Various exemplary embodiments provide a system, in which the casing may enclose the printer or the printer may be mounted inside the casing. Various exemplary embodiments provide a system, in which at least one printer can print at least one label individually for at least one target container.

In various exemplary embodiments the printer may include a black and white printer for printing black and white labels or printing on the target containers in black and white, or a color printer for printing color labels or printing on the target containers in color.

Various exemplary embodiments provide a system, in which a target container for holding the manufactured cosmetic treatment product has a volume in a range of, for example, from about 400 ml to about 600 ml, for example, about 500 ml.

In various exemplary embodiments a target container for holding at least one mixture may have a volume in a range from about 30 ml to about 70 ml, preferably in a range from about 40 ml to about 60 ml, even more preferably of about 50 ml.

Various exemplary embodiments provide a system in which, by employing a computer application or mobile application (hereinafter referred to as computer app), a personalized design of the label or lettering can be sent to the system or a printer, for example together with information or data on a mixing ratio of liquids or information on a composition of a cosmetic treatment product or assignment information on the user for whom the cosmetic treatment product was manufactured.

In various exemplary embodiments a calculation of the mixing ratio is performed on a remote server or in a cloud and the user-specific information regarding the mixing ratio is transmitted from the server or from the cloud to the computer app.

Various exemplary embodiments provide a system by employing which a provision of personalized compositions of cosmetic treatment products can be realized. In other words, according to various exemplary embodiments, at least one individualized cosmetic treatment product can be provided for at least one part of the body of a specific user, for example a user's skin and/or hair of a user.

Various exemplary embodiments provide a system by employing which an individual mixing ratio of liquids for the production of a cosmetic treatment agent or an individual composition of a cosmetic treatment agent based on user-specific information can be realized.

Various exemplary embodiments provide a system by employing which a personalized cosmetic hair treatment product can be produced based on a condition of a user's hair.

Various exemplary embodiments provide a system by employing which a personalized cosmetic skin treatment product can be produced based on a user's skin condition.

Various exemplary embodiments provide a system by employing which it can be possible to realize a cosmetic treatment agent individually designed for a user, for example by employing a printer, for printing a label and/or on a target container, which can hold the cosmetic hair treatment agent.

Various exemplary embodiments provide a system, in which a mobile device can display information to a hairdresser and/or a user by employing a computer app and/or the hairdresser or the user can select at least one item of information.

Various exemplary embodiments provide a system in which only the plurality of peristaltic pumps can have movable mechanical components.

Various exemplary embodiments provide a system where a server or a cloud can be accessed via a computer app. Various exemplary embodiments provide a system, in which the computer app can be run on a mobile device such as a smartphone or tablet. Various exemplary embodiments provide a system, in which the computer app can perform a database query on the server or in the cloud based on known user data. Various exemplary embodiments provide a system, in which user information known during the database query can be compared with user data stored on the server or in the cloud and, based on this, user-specific information or data concerning a mixing ratio or composition can be transmitted from the server or from the cloud to the mobile terminal. Various exemplary embodiments provide a system, in which the mobile computer app receives information concerning a composition which may be stored on the server or in the cloud, for example based on a previously performed measurement of a hair condition and/or a hair damage condition and/or a hair color measurement.

Various exemplary embodiments provide a system, in which a calculation of a mixing ratio or composition can be performed on the server or in the cloud.

In various exemplary embodiments it is therefore possible to dispense with additional local memory for local storage of mixing ratios or composition.

Various exemplary embodiments provide a system, in which the computer app can be further configured to provide a label design based on the information regarding a composition or a mixing ratio of liquids. Various exemplary embodiments provide a system, in which a design of at least one sticker medium of a wireless data transmission connection provided by employing the computer app can be transmitted to an electronic system or a printer comprising the system.

Various exemplary embodiments provide a system that allows to get along without direct user input at the system and to realize the communication with the system by employing a computer app on a mobile device, for example a smartphone or a tablet.

In various exemplary embodiments it is possible to do without a user interface, for example a GUI, for example a touch screen, on the system. In various exemplary embodiments it is possible to do without additional components.

Various exemplary embodiments provide a system that may include a mixing device comprising a static mixing device and/or an outlet or a nozzle and/or a chamber.

In various exemplary embodiments a system can be provided, in which the individual liquids can be discharged mixed or blended at the outlet of the mixing device.

In various exemplary embodiments a system can be provided, in which a mixing device may comprise at least one nodal point at which, for example, different liquids from the reservoirs may meet, and at least one static mixing nozzle in which, for example, the different liquids are statically mixed.

Various exemplary embodiments provide a system in which a static mixer or a pipe installation includes a plurality of guiding devices, which for example mixes at least one liquid on a predefined path.

Various exemplary embodiments provide a system, in which a static mixer has a plurality of internal elements designed in a row, for example straight and/or curved blades. Various exemplary embodiments provide a system, in which the mixer can be positioned in a mixing tube and/or the mixer can be inserted into the mixing tube and/or be removable or replaceable. Various exemplary embodiments provide a system, in which a displacement of laminar fluid flows is achieved by employing a static mixer. Various exemplary embodiments provide a system comprising a plurality of screw turns, for example one screw turn on the right, for example by about 180 degrees, and one screw turn on the left, for example by about 180 degrees, which can be rotated by about 90 degrees relative towards each other. Various exemplary embodiments provide a system, in which internal elements in a static mixer can divide, twist and/or recombine a fluid flow. Various exemplary embodiments provide a system, in which inner elements in a static mixer divide a liquid mixture including at least two liquids so that at least four layers can be formed after bringing the liquids together after the inner elements. The static mixer is preferably made of stainless steel.

Various exemplary embodiments provide a system, in which a plurality of peristaltic pumps can be operated synchronously to deliver an entire content nearly simultaneously and/or in a predefined relationship to a target device, such as a mixing device.

Various exemplary embodiments provide a system, in which a nodal point can be connected to the static mixing device.

Various exemplary embodiments provide a system, in which liquids from a plurality of reservoirs can be mixed after passing through a nodal point and/or static mixing device.

Various exemplary embodiments provide a system, in which a nodal point may include a plurality of ports. The ports can be provided, for example, to be connected to pipes or hoses, which may be connected at another end to at least one peristaltic pump.

Various exemplary embodiments provide a system, in which the mixing device is a static mixing device for mixing liquids and in which the flow movement alone can cause the mixing of at least two liquids.

Various exemplary embodiments provide a system in which a static mixing device can include flow-influencing inner elements in a pipe or line, whereby the flow-influencing inner elements can alternately divide the material flow and then recombine the material flow, thus achieving the mixing of substances or liquids. Various exemplary embodiments provide a system in which the inner elements (e.g. blades or liquid guiding elements) can comprise, for example, a material such as plastic and/or metal. Preferably the inner elements are made of stainless steel.

Various exemplary embodiments provide a mixing device that can enable at least one of continuous operation, can have no moving components, can have low investment and/or operating costs, can be virtually maintenance free, can be manufactured in any material, can be small in size, can have no separate cleaning costs, can be rinsed in the installed state, where liquids to be mixed cannot have contact with the environment, can be sterile and hygienic, cannot include a drive such as a motor, cannot require large mixing tanks, can show only slight wear, cannot have electrical connections, can be installed and removed quickly, especially by technical laymen.

In various exemplary embodiments a system can be provided, which may include a device for collecting or receiving waste products that may arise from the filling of at least one mixture of several liquids.

In various exemplary embodiments a system can be provided, in which excess fluids can be placed in a device for collecting or receiving waste products. In various exemplary embodiments a system can be provided, in which excess fluids can be placed in a device for collecting or receiving waste products. In various exemplary embodiments the device may further comprise a sensor, for example a level sensor, for example a capacitive sensor, an ultrasonic sensor, an electro-mechanically actuated float, to inform a user of a level quantity. In various exemplary embodiments a system can be provided, in which the device is capable of receiving waste products, for example excess parts, which may escape from the mixing device.

In various exemplary embodiments a system can be provided, in which a waste device can have a volume in a range from about 200 ml to about 400 ml, preferably from about 300 ml.

Various exemplary embodiments provide a system that can enable a cleaning operation of the mixer not to require separate or additional cleaning agents, but to use at least one liquid from a reservoir for cleaning, which can be used as a base for the production of individual cosmetic treatment products.

Various exemplary embodiments provide a system in which a cleaning process using a base liquid, for example a shampoo base liquid, for example in a range of from about 1 ml to about 5 ml, for example in a range of from about 2 ml to about 4 ml, preferably in a range of about 3 ml, may be sufficient that no mixing ratio individually created for a user or no composition individually created for a user can be contaminated by a previously used liquid within the mixer.

It is preferred that the base is at least about 60% by weight and more preferably about 80% by weight based on the total weight of the cosmetic treatment composition to be prepared. It is also preferred that the base is identical for all cosmetic treatment products which can be produced with the system.

Various exemplary embodiments provide a system which can make it possible that no treatment agent individually created for a user is contaminated by a separate cleaning agent.

In various exemplary embodiments a system can be provided, in which at least one container for filling in a liquid mixture may be positioned below the mixing device, preferably exactly below an outlet of the mixing device. In various exemplary embodiments a system can be provided, in which at least one holding device for at least one target container can be provided. In various exemplary embodiments a holding device can be positioned below the mixing device or a nozzle of the mixing device in such a way that the at least one target container can be held securely by employing the holding device. In various exemplary embodiments a system can be provided, in which a minimum distance between the nozzle and an upper edge of a target container may have a value preferably less than about 10 mm, preferably less than or equal to about 9 mm.

In various exemplary embodiments a distance between the nozzle or the tip of the nozzle and a front outer wall of a casing of the system may be at least about 60 mm, preferably at least about 40 mm. In various exemplary embodiments a system can be provided, which system may further comprise a sensor or proximity switch, which proximity switch may be located behind the target container. The proximity switch may inform an electronic system or mixing device, for example by employing an electrical signal, whether or not a target container is in the holding device. In various exemplary embodiments a maximum distance between a proximity sensor and a target container can be about 30 mm, preferably about 20 mm. In various exemplary embodiments a proximity switch can have a capacitive sensor and/or an inductive sensor and/or an optical sensor and/or an ultrasonic sensor and/or a magnetic sensor.

In various exemplary embodiments a system can be provided, which has at least one reservoir, which can be made airtight. In various exemplary embodiments a system can be provided, in which at least one liquid can be filled in at least one airtight reservoir. In various exemplary embodiments a hairdresser or a user may replace at least one airtight reservoir with a new airtight reservoir if the reservoir contains no or only small amounts of liquid.

In various exemplary embodiments a system can be provided, where it can be made possible that all reservoirs can be made airtight. In various exemplary embodiments a system can be provided, in which the reservoir is in the form of airtight bags. In various exemplary embodiments a system can be provided, in which no additional pressure for emptying the reservoir is required compared to bottles or cartridges, for example. In principle, the system may also be provided with reservoirs in the form of bottles or cartridges. However, this is less preferred. In various exemplary embodiments a hygienic system can be provided, in which it can be avoided that liquids can leak out of the reservoirs.

In various exemplary embodiments a system can be provided, in which a plurality of peristaltic pumps may be directly connected to at least one respective associated reservoir or may each be attached with a small pipe connection section (tube connection section or hose connection section) between a plurality of peristaltic pumps and the respective associated reservoirs.

In various exemplary embodiments a system can be provided, in which the plurality or all of the lines (pipes or hoses) from the peristaltic pump to the at least one mixing device may have a predetermined length, preferably an equal length.

In various exemplary embodiments a system can be provided, in which the plurality or all of the lines (tubes or hoses) from the reservoirs to the peristaltic pumps may have a predetermined length, preferably a length equal to zero. In other words, according to various exemplary embodiments, the plurality of reservoirs can be installed directly at the associated peristaltic pumps so that no pipe (tube or hose) is necessary between the plurality of reservoirs and the plurality of peristaltic pumps.

In various exemplary embodiments a system can be provided, in which a small hose connection section between a reservoir and a peristaltic pump of approximately the same size or predefined length can be provided. In various exemplary embodiments a system can be provided, in which it is possible to precisely determine a quantity of liquid conveyed by a peristaltic pump.

In various exemplary embodiments a system can be provided, in which the reservoirs can be placed vertically to a base and/or with an opening downwards.

In various exemplary embodiments it can be achieved that the storage containers can be easily replaced by the hairdresser and/or the user.

In various exemplary embodiments a volume of a reservoir can be designed flexibly. In various exemplary embodiments for example, two reservoirs of the plurality of reservoirs can each comprise a volume, for example in a range of from about 1 liter to about 3 liters, for example about 2 liters, and eight reservoirs of the plurality of reservoirs can each comprise a volume, for example in a range of from about 300 milliliters to about 700 milliliters, for example about 500 milliliters. Each of the large reservoirs preferably contains a liquid which serves as a base for the cosmetic treatment products to be manufactured. The small reservoirs each preferably contain a liquid containing active ingredients, coloring agents and/or perfume for the cosmetic treatment compositions to be manufactured.

In various exemplary embodiments a system can be provided, in which at least one electronic system of at least one including a proximity sensor for detecting at least one target container, at least one proximity sensor for detecting a filling level in a device for detecting a waste quantity, at least one start-pause switch, for example a button, comprising a red-yellow-blue light emitting diode (RGB LED), at least one stop switch, for example a button comprising a red LED, a progress bar or a progress indicator device comprising for example nine LEDs, at least one RGB LED target container ring, ten interchangeable reservoir panels each comprising a reset button, another button and two LEDs.

In various exemplary embodiments a system can be provided, where electronics or an area containing the electronics are easily accessible for repair purposes, etc. In various exemplary embodiments it can be achieved that not the whole system has to be disassembled.

In various exemplary embodiments a system can be provided, which, by employing a mixing device, is capable of providing a plurality of different variations of personalized cosmetic treatment products, such as shampoos, deep conditioners, conditioners and/or hair color shades, for example about 128.

In various exemplary embodiments a system can be provided, which has at least one optical feedback, for example at least one LED for indicating at least one state of at least one component of the system or sub-components of the system.

In various exemplary embodiments a system can be provided, comprising a data transmission connection, for example wireless or wired, with at least one mobile device, for example a smartphone or a tablet or a server.

In various exemplary embodiments a system can be provided, which can communicate with a remote server via a data transmission connection for data exchange.

In various exemplary embodiments a system can be provided, in which a composition of a cosmetic treatment agent, in particular a hair treatment agent, can be transmitted via a wireless data transmission connection, for example a Wi-Fi connection, a Bluetooth connection, an NFC connection, a Thread connection, a ZigBee connection or the like by employing a mobile computer app.

In various exemplary embodiments a system can be provided, in which the mobile computer app can transmit a received composition or a mixture ratio of at least two liquids of a cosmetic treatment agent to the system via a wireless data transmission connection.

In various exemplary embodiments a system can be provided, in which at least one configuration of a mixing device and/or a device administration or device management can be realized by employing a server and/or a cloud.

The configurations and advantages described above refer to the system and the procedure.

In this respect, directional terminology such as "top", "bottom", "front", "back", "foremost", "rearmost", etc. is used with reference to the orientation of the Figure(s) described. Since components of exemplary embodiments can be positioned in a number of different orientations, directional terminology is used for illustration purposes and is not restrictive in any way. It goes without saying that other exemplary embodiments can be used and structural or logical changes can be made without deviating from the scope of protection of the present disclosure.

Furthermore, it goes without saying that the features of the various exemplary embodiments described herein may be combined with each other, unless specifically stated otherwise.

In this context, "color" may be understood to mean a combination of a shade of color (i.e. a spectral color impression, also called hue, which may be understood to mean what is considered to be the "actual color"), a color intensity (i.e. how intense the color appears, e.g. compared with a neutral grey, which is also called saturation, color saturation, colorfulness, chromaticity or color depth) and a brightness (i.e. how light or dark the color appears).

In various exemplary embodiments the color information can, for example, be parameterized in a known color space, for example in a L*a*b* color space (where L* indicates the brightness of a color, a* the green and red components and b* the blue and yellow components of the color), in a RGB color space by color components in red, green and blue, in a CMYK color space by color components in cyan, magenta, yellow and black, or in any other color space.

In this context, the term "shade of color" may be understood to mean a color value or the spectral color impression of a color, regardless of how it may be parameterized, for example as a point in a two-dimensional color space (e.g. a*b* of the L*a*b* system) or a ratio of color components (as in the RGB color space or the CMYK color space).

In various exemplary embodiments a color space from which the color information (skin color information and image color information) originates can be such that a determined or represented color is independent of a medium through which the color is determined or represented (e.g. screen, printer, scanner, human eye, etc.). The color space can be, for example, an L*a*b* color space, the color information a shade of color parameterized, for example, by employing a* and b*.

In the case of a smartphone mentioned herein, unless the context indicates otherwise, this is to be understood as representative of all similar types of portable data processing devices, i.e. smartphones, tablets, laptops, etc., and the same applies analogously to smartphone cameras, etc.

In this context, a computer app can be defined as application software for mobile devices or computers or mobile operating systems. A computer app may provide digital information to a user and may include a user interface, such as a graphical user interface for a user's interaction with the computer app.

In this context, a peristaltic pump or a squeeze pump or a hose pump may be understood to be a positive displacement pump for pumping or transferring liquids. In the case of a peristaltic pump, a liquid to be pumped can be forced through the tube by external mechanical deformation of a tube. In operation, a tube is supported on a pump head casing while the tube is clamped from the other side by at least one roller or shoe rotating on a rotor (radial action system) or moved by a camshaft (linear or horizontal action system). The movement causes the clamping point to move along the hose, thereby allowing the pumped liquid to move forward. In the case of peristaltic pumps, the elasticity of the tubing material can create a suction pressure.

In various exemplary embodiments a peristaltic pump can be provided, which can have a large pump head, a large diameter of the pressure rollers and an asymmetric tube path, whereby the asymmetric tube path can further increase the effective head diameter.

In various exemplary embodiments it can be achieved that a life span of the tubing can be substantially increased and consequently a flow rate can be kept constant for a longer time and a pulsation of a liquid flow in the tubing can be substantially reduced.

In this context, laminar flow can be defined as a simple flow whose behavior is determined by the internal friction in a liquid. In other words, a laminar fluid flow in a pipe exists if the fluid can be divided into an infinite number of infinitely thin concentric hollow cylinders. For example, in laminar flow, such as in viscous fluids such as a shampoo, conditioner, deep conditioner or hair dye, the layers of fluid slide smoothly over each other. Acceleration and velocity of liquid particles can be described by two parameters: internal friction is the force acting per volume in the liquid, described by the equation $$F_r = \eta \times \Delta v$$

where η is the viscosity of the liquid and v is the velocity of the liquid particles. The second parameter is the pressure gradient $$R_p = -dp/dx$$

where p is the pressure. In laminar flows no significant mixing processes occur.

In this context, the term viscosity can be used to describe the viscosity or tenacity of liquids. The greater the viscosity, the more viscous or less flowable the liquid is. The lower the viscosity, the thinner or more fluid the liquid is, so that the liquid can flow faster under the same conditions.

In this context, the term "viscous liquid" may be understood to mean a liquid whose viscosity can be at least about 2,000 MPas (megapascal seconds), preferably in a range of from about 5,000 to about 20,000 MPas. The viscosities of the cosmetic treatment products manufactured, in particular of shampoos or conditioners, preferably also have a viscosity of at least about 2,000 MPas (megapascal seconds), preferably of from about 5,000 to about 20,000 MPas. Viscosity is determined under the following conditions: Brookfield DV 2+, spindle 5, 20 rpm, 20° C. and 60 seconds.

In this context, a non-Newtonian fluid may be understood to be an anomalously viscous fluid whose deformation behavior can no longer be described using Newton's law. The viscosity of non-Newtonian fluids changes in particular with shear rate and/or load duration.

Non-Newtonian fluids can have a viscosity that changes with the load. This is due to the molecular structure or the interaction of the phase components, which show a different behavior in the case of strong movement, for example shear, than they do in a state of rest. The power required for mixing or stirring cannot increase linearly with the velocity of gravity in non-Newtonian fluids, but can be an exponential function.

In other words, a non-Newtonian fluid may originally have a viscous consistency, but when subjected to a force, it may become less viscous during the application of the force. When the force applied to the liquid is removed from the liquid, it returns to its original viscous state.

In this context, the term thixotropy is used to describe a phenomenon whereby viscous or highly viscous liquids, such as gels, shampoos, conditioners, hair dyes, creams, etc., become more fluid or less viscous when mixed or stirred or shaken and then solidify again. A thixotropic system can be a non-Newtonian liquid in this case. These material systems are exemplified by the fact that they can change their flowability when external forces are applied.

FIG. 1 is a schematic illustration 100 of a system 1 for creating a liquid mixture according to various exemplary embodiments.

System 1 may be connected to at least one mobile device 2 via a data transmission connection 4 according to various embodiments. The mobile device 2 may be, for example, a smartphone, tablet or laptop. According to various embodiments, mobile device 2 can have a computer app installed. According to various embodiments, the computer app may be intended to exchange data or information between a database 3 and system 1. The data transmission connection can be a wired connection, for example an Ethernet connection, or a wireless connection, for example a WLAN (Wireless Local Area Network) connection, Wi-Fi connection, GSM (Global System For Mobile Communication) connection, NFC (Near Field Communication) connection, Bluetooth connection, ZigBee connection, or Thread connection. Thus, in various exemplary embodiments system 1 can be connected to a smartphone or tablet as mobile device 2 via a Wi-Fi connection to exchange data or information. However, the data transmission connections mentioned herein are not limited to the connections mentioned, and other connections suitable for transmitting data or information can be realized.

System 1 may include at least one database 3 according to various exemplary embodiments. Database 3 may be, according to various embodiments, a memory or a server or a cloud or a computer network and can include, for example, a computer unit. According to various embodiments, database 3 may be connected to the mobile device 3 via a data transmission connection 5. The data transmission connection 5 may be a wired connection, such as an Ethernet connection, or a wireless connection, such as a WLAN connection, Wi-Fi connection, GSM connection, NFC connection, Bluetooth connection, ZigBee connection, or Thread connection. However, the connections mentioned herein are not limited to the data transmission connections mentioned, and other data transmission connections (network protocols) suitable for the transmission of data or information may be implemented.

In various exemplary embodiments system 1 may be connected to database 3. According to various exemplary embodiments, the data transmission connection may be a wired connection, for example an LAN or Ethernet connection, or a wireless connection, for example a WLAN connection, Wi-Fi connection, GSM connection, NFC connection, Bluetooth connection, ZigBee connection, or Thread connection.

In various exemplary embodiments system 1 may include at least database 3. In various exemplary embodiments System 1 may include several, for example 2, 3 or 4 databases.

In various exemplary embodiments database 3 may contain information on at least one mixing ratio of cosmetic treatment products. In various exemplary embodiments database 3 may comprise at least one data set in which quantity information concerning mixing ratios or compositions for the production or manufacture of liquid mixtures, for example of shampoos, conditioners, deep conditioners and/or hair dyes, may be stored. Furthermore, in various exemplary embodiments user-specific information may be archived in database 3. In various exemplary embodiments user-specific information may include, for example, information about a hair color and/or a target hair color, and/or information about a degree of hair damage. In various exemplary embodiments at least one item of information may be stored regarding a flow rate to be achieved by employing a peristaltic pump. In various exemplary embodiments at least one item of information regarding an operating pressure value, for example a set pressure value or an operating pressure or an operating pressure to be achieved by employing a pump, may be stored. In various exemplary embodiments at least one pump delivery pressure may be stored or archived for each source liquid in database 3 for the generation of a mixture of different source liquids. In various exemplary embodiments at least one flow rate of at least one peristaltic pump stored in database 3 may be provided and/or read out. In various exemplary embodiments at least one flow rate for a peristaltic pump together with a mixing ratio or a composition may be stored and/or read out from memory. In various exemplary embodiments a hair color of a user's hair and/or a degree of damage to a user's hair and/or a target hair color of a user may be stored as a record in database 3. In various exemplary embodiments after an analysis of a hair color condition of a user's hair detected by a sensor, for example a spectrophotometer or a colorimeter or a camera, and/or a degree of hair damage to a user's hair detected by a sensor, for example an infrared spectrometer, and an evaluation, predefined mixing ratios of liquids may be calculated or a suitable mixing ratio may be selected from database 3. In various exemplary embodiments based on the data stored in database 3, an individual mixing ratio of at least two liquids for the preparation of a cosmetic treatment product, optimally designed to the condition of a user's hair, may be provided to a system 1 via a data transmission connection 4 and a data transmission connection 5 by employing a mobile device 2.

In various exemplary embodiments further user-specific data or information may be entered by employing a computer app installed on the mobile device 2, for example a flow rate, which can be used to operate at least one pump intended for mixing a plurality of liquids. In various exemplary embodiments the further user-specific data or information may be forwarded to the system via data transmission connection 4.

In various exemplary embodiments at least one data record in database 3 may be transmitted to system 1 via data transmission connection 6 or database 3 may be coupled to system 1 via data transmission connection 6, for example a Wi-Fi connection and/or a WLAN connection. However, the data transmission connections mentioned herein are not limited to the data transmission connections mentioned, and other data transmission connections suitable for the transmission of data or information are feasible.

Figure 2:
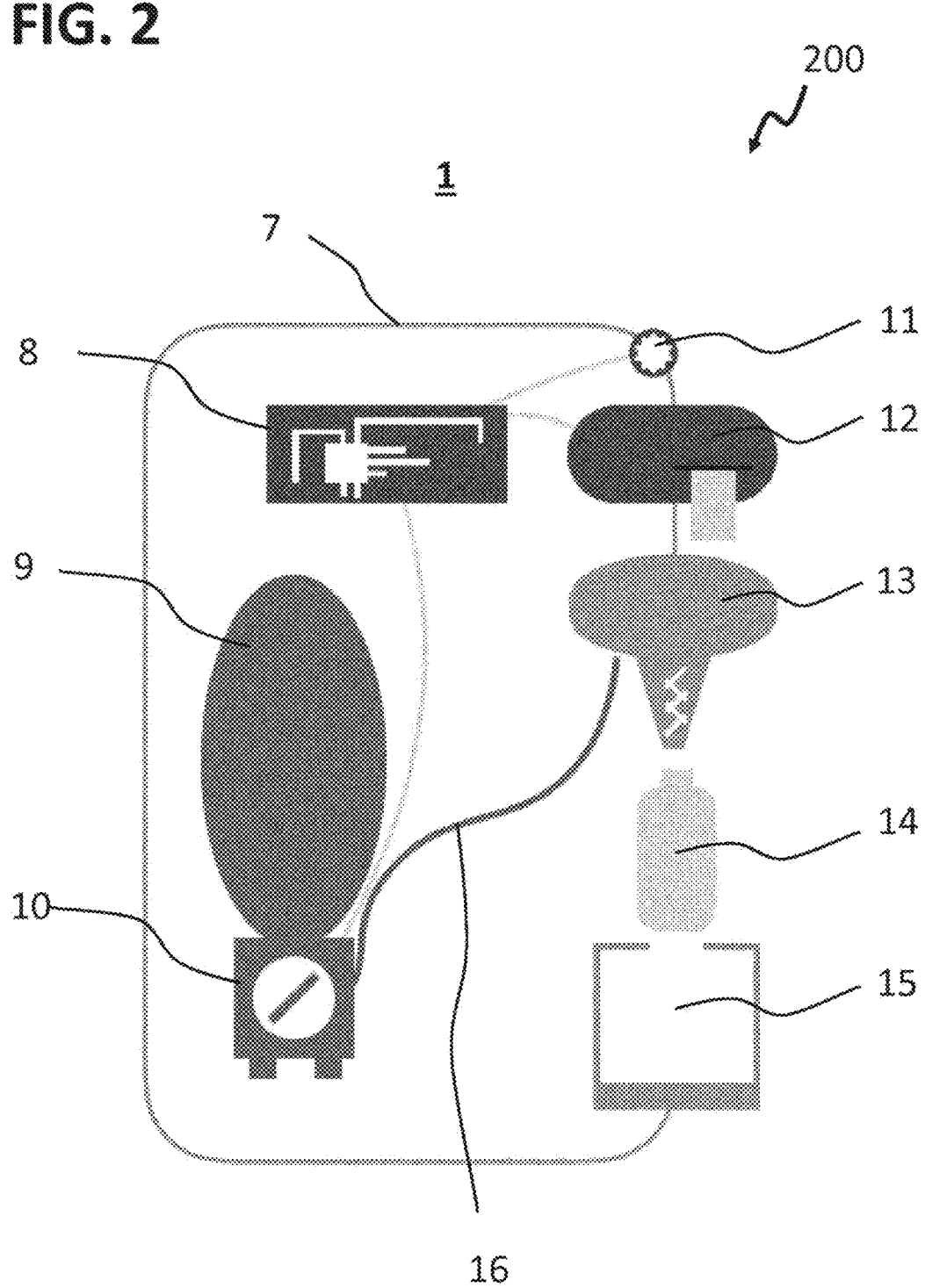
FIG. 2 is a schematic illustration of a system for producing a liquid mixture according to various exemplary embodiments.

FIG. 2 shows a schematic illustration 200 of a system 1 for generating a liquid mixture according to various exemplary embodiments.

System 1 may include, according to various exemplary embodiments, at least one of the following components: a casing 7, at least one electronic system 8, at least one reservoir 9, at least one pump 10, at least one user interface 11, at least one printer 12, at least one mixing device 13, at least one target container 14, at least one waste device, at least one connection 16 (tube or hose).

In various exemplary embodiments of system 1, a casing 7 can be provided to accommodate components of system 1. In various exemplary embodiments the casing 7 may be intended to represent a brand. In various exemplary embodiments of system 1, the casing may comprise at least one component selected from electronics, a plurality of reservoirs for storing liquids, at least one connection (tube or hose), a plurality of peristaltic pumps, a user interface, a printer, a mixing device, at least one target container for receiving a liquid mixture, at least one device for receiving or collecting waste, for example a waste container, a data transmission connection, for example a wired or wireless connection.

In various exemplary embodiments system 1 may comprise at least one electronic system 8 or electronic component capable of controlling or regulating at least one electrical component of system 1.

In various exemplary embodiments system 1 may comprise at least one reservoir 9 capable of holding liquids.

In various exemplary embodiments the at least one reservoir can hold or store viscous liquids, for example liquids for the production of cosmetic hair treatment products such as shampoos, conditioners, deep conditioners, hair dyes, etc.

In various exemplary embodiments system 1 may comprise at least one connection 16 (tube or hose), which connection 16 may be designed, for example, to connect an interior of at least one reservoir 9 to an interior of a mixing device and/or to carry at least one liquid.

In various exemplary embodiments system 1 may comprise a plurality of peristaltic pumps 10, for example to draw in and/or transport and/or deliver liquids from at least one reservoir and/or to a mixing device. In various exemplary embodiments the plurality of peristaltic pumps can be electronically operated. In various exemplary embodiments a number of revolutions of a pump wheel can correspond to a precise flow rate of a pump. In other words, an exact flow rate can be determined or set by employing a predefined number of revolutions of a pump wheel.

In various exemplary embodiments system 1 may comprise at least one user interface 11, which can simplify machine-user interaction.

In various exemplary embodiments system 1 may comprise at least one printer 12 capable of printing personalized labels for target containers and/or printing personalized lettering and/or graphics on surfaces of target containers.

In various exemplary embodiments system 1 may comprise at least one mixing device 13. In various exemplary embodiments the mixing device 13 can mix a plurality of viscous liquids and/or produce or dispense a mixture of viscous liquids.

In various exemplary embodiments system 1 may comprise at least one target container 14. In various exemplary embodiments the at least one target container 14 can hold at least one liquid, for example a liquid mixed by mixing device 13.

In various exemplary embodiments system 1 may comprise at least one waste device 15 or a device for collecting or receiving waste products, for example a cleaning agent and/or a liquid mixed by employing mixing device 13.

In various exemplary embodiments system 1 may include a mobile device 3 on which a computer app is installed. In various exemplary embodiments a hairdresser and/or another user can operate the mobile device 3, for example a smartphone or tablet. The hairdresser and/or another user can use the computer app to select a user from a database 3, for example a customer in a hairdressing salon. The computer app may be connected to database 3 according to various embodiments as described above. In various exemplary embodiments based on a decision of a hairdresser and/or a customer and/or a user, an individual cosmetic treatment product, for example a shampoo, a conditioner, a deep conditioner or a hair dye, can be selected by employing the computer app. By employing the computer app, a request based on the selected cosmetic treatment product can be submitted to database 3. In database 3, mixing ratios of liquids and/or individual designs (layouts) for the printing of target containers 14 for finished liquid mixtures can be stored as memory values assigned to a respective cosmetic treatment product. Furthermore, according to various embodiments, additional operating pressures for pumps can be stored as memory values. Based on a selected individual cosmetic treatment agent, individual mixing ratios for the desired cosmetic treatment agent and/or a predefined flow rate of at least one peristaltic pump, preferably of the plurality of peristaltic pumps, which is/are intended for producing a mixture of a plurality of liquids, can be provided. In various exemplary embodiments the computer app can receive the mixture ratio for liquids individually compiled for the respective customer for the production of a cosmetic treatment agent via the data transmission connection 5 as already described above.

According to various embodiments, the computer app can forward the data received from database 3 to system 1 via data transmission connection 4 and/or additionally modify the data or adapt it by selecting a layout for printing the plurality of target containers 14 before the data can be forwarded to system 1 as described above.

In various exemplary embodiments System 1 may comprise electronics 8 that can, for example, establish a wireless Wi-Fi connection with mobile device 2 and/or receive data from mobile device 2. In various exemplary embodiments the electronics 8 may be intended to operate a radio module and/or the plurality of pumps 10 and/or a user interface 11 and/or a printer 12 and/or optical feedback concerning a level indicator of a waste device 15, a correct or incorrect positioning of a target container 14.

In various exemplary embodiments System 1 can be operated by employing a supply voltage, for example a mains supply voltage, or can be operated by employing a battery or a rechargeable battery.

In various exemplary embodiments System 1 can precisely control or regulate a plurality of peristaltic pumps 10 based on a flow rate or a speed of the pump wheel transmitted by the data. In various exemplary embodiments the plurality of peristaltic pumps can draw in liquids from the plurality of reservoirs and transport them via hoses of substantially equal length to a mixing device 13.

In various exemplary embodiments a reservoir 9 can be positioned directly at a peristaltic pump 10. In various exemplary embodiments it is possible to achieve a precise delivery of liquids for a cosmetic treatment product.

Figures 3A, 3B:
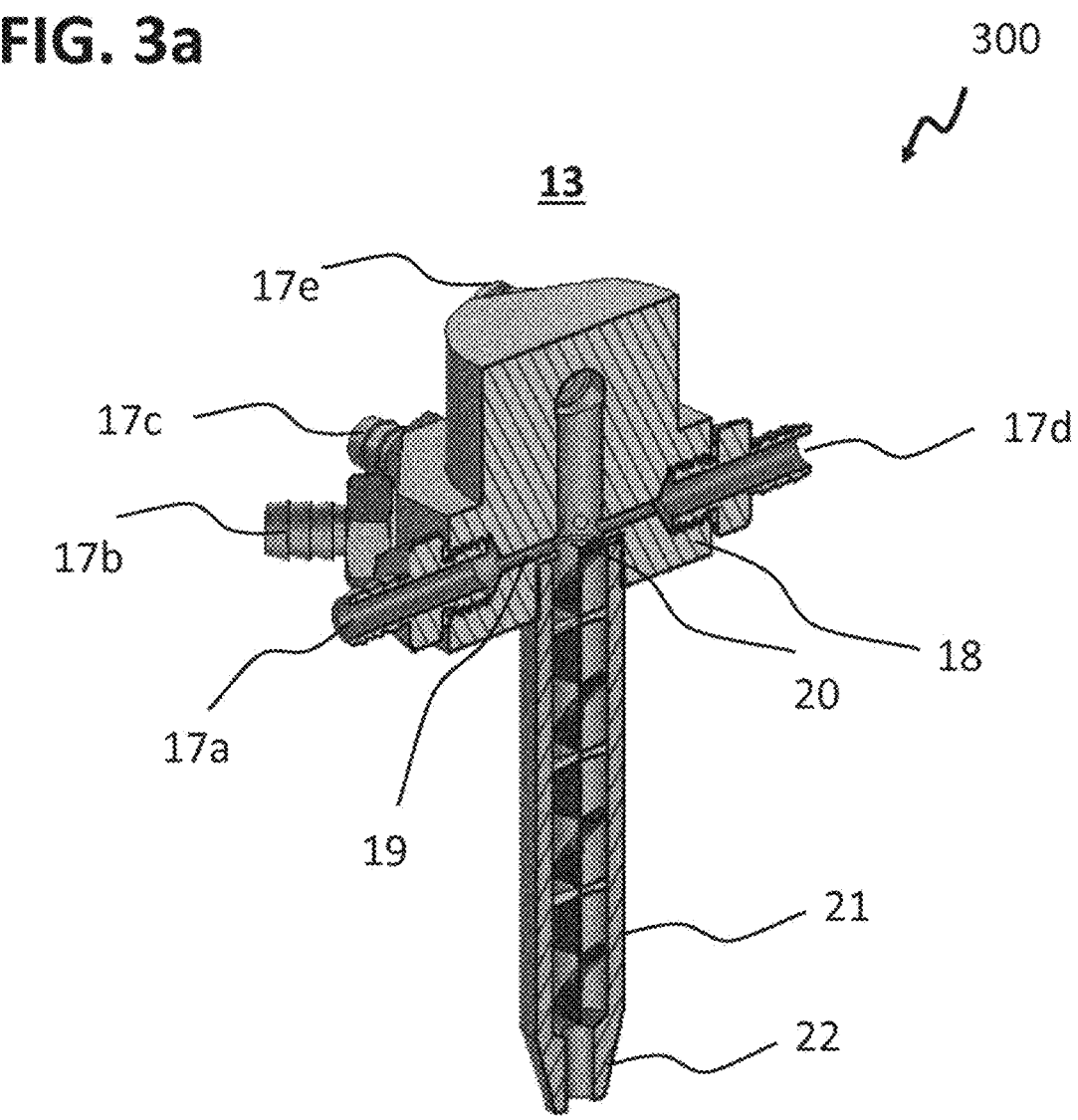
FIG. 3a is a schematic sectional view of a mixing device according to various exemplary embodiments.
FIG. 3b is a schematic isometric illustration of a mixing device according to various exemplary embodiments.

FIG. 3a shows a schematic sectional view 300 of a mixing device 13 according to various exemplary embodiments.

FIG. 3b shows a schematic isometric illustration of a mixing device according to various exemplary embodiments.

Mixing device 13 can be constructed in several parts according to various exemplary embodiments. Mixing device 13 can have a collecting device 18, for example a collecting chamber, and a mixing tube 21 according to various exemplary embodiments.

In various exemplary embodiments collecting device 18 can have a plurality of channels 19, whereby the plurality of channels 19 can meet in a chamber 20. In various exemplary embodiments channels 19 may be designed to receive at least one liquid, for example under increased flow velocity, to pass through channels 19. In various exemplary embodiments chamber 20 may have a diameter of about 4.2 mm and/or a volume of about 0.2 cm³. In various exemplary embodiments the plurality of channels 19 can have a diameter of about 1 mm. In various exemplary embodiments the at least one channel 19 may be connected to a port, for example a pipe or hose, via an adapter 17a to 17d. In various exemplary embodiments the plurality of adapters 17a to 17d may be connected to the collection device 18 by employing a screw thread connection, for example an M5 thread, as illustrated in FIG. 3.

In various exemplary embodiments the collection device 18 can be connected to a mixing tube 21. In various exemplary embodiments a connection between the collection device 18 and the mixing tube 21 can be realized by employing a screw connection, for example the mixing tube 21 can be screwed into the collection device 18, as shown in FIG. 3. In various exemplary embodiments the mixing tube 21 can have an outlet 22.

In various exemplary embodiments the liquids supplied by hoses 16 can be supplied at a predefined operating pressure or flow rate of the plurality of pumps at the adapters 17a to 17e and can be combined by the plurality of adapters 17a to 17e and a plurality of channels 19 in a collecting device 18 in a chamber 20. In various exemplary embodiments the combined liquids or source liquids from the plurality of reservoirs 9 can be fed into a mixing tube 21.

In various exemplary embodiments for example by employing an adapter 17e, a liquid which forms the basis of a cosmetic treatment product can be supplied for the preparation of the cosmetic treatment product or a liquid which forms the basis of a cosmetic treatment product can be supplied for cleaning the mixer in the mixing tube 21 or for disinfecting or sterilizing an outlet 22 of the mixing tube 21 or between two mixing operations by employing the mixing device 13.

The mixing tube 21 may comprise a static mixer in various exemplary embodiments.

In various exemplary embodiments the static mixer may comprise at least one internal element, preferably a flow internal element, which has a predefined specific length so that the best possible mixing ratio can be achieved.

In various exemplary embodiments a static mixer may comprise at least one of a mixing head, at least one adapter or hose nozzle, a mixing tube, a mixer.

In various exemplary embodiments a static mixer may comprise a length, for example in the range of from about 30 mm to about 90 mm, preferably in the range of from about 35 to about 70 mm. The length of the static mixer also depends on the quantity, viscosity and number of liquids to be mixed.

In various exemplary embodiments a static mixer may be realized as a Kenics-type mixer. In various exemplary embodiments a static mixer may comprise a plurality of plates twisted by about 180 degrees. In various exemplary embodiments a static mixer may comprise a plurality of coils, wherein at least one coil may be positioned offset by about 90 degrees to a previous one and/or wherein coils may comprise an opposite direction of rotation to each other.

In various exemplary embodiments a static mixer may comprise a helix, for example in the form of a rod with attached internal elements, which is positioned centrally inside the static mixer as a mixer. In various exemplary embodiments a static mixer may comprise at least four, preferably seven, inner elements and/or may comprise an inner element length of from about 4 to about 8 mm and/or a total length of from about 35 to about 70 mm and/or an inner diameter of from about 5 to about 10 mm and/or an outlet nozzle diameter of about 2.5 mm and/or an outlet nozzle length of about 6 mm.

In various exemplary embodiments a mixing tube may comprise a length, for example in a range of from about 20 mm to about 50 mm, for example in a range of from about 25 mm to about 45 mm, for example about 40.5 mm, and/or a mixing tube may comprise an outer diameter of about 8 mm.

In various exemplary embodiments a mixing tube may comprise an outlet 22 or a nozzle, wherein a length of the outlet 22, for example in a range from about 3 mm to about 10 mm, for example, may have a value of about 6 mm.

In various exemplary embodiments an outer diameter of outlet 22 may have a value of about 5 mm and an inner diameter of about 2.5 mm.

In various exemplary embodiments a mixing head may have a height of about 20 mm and/or two interconnected components with a height of about 10 mm each.

In various exemplary embodiments a mixing head may comprise a plurality of ports (inlets), wherein the nozzles can be positioned on a plane perpendicular to a longitudinal axis of a mixing tube.

In various exemplary embodiments a mixing head may comprise a plurality of ports (inlets), wherein the ports (inlets) can be positioned on a different plane perpendicular to a longitudinal axis of a mixing tube.

In various exemplary embodiments a mixing head may comprise a plurality of ports (inlets), wherein the ports (inlets) may be designed point-symmetrically about a center of the mixing head.

In various exemplary embodiments a mixing head may comprise a plurality of ports (inlets), wherein at least one port may be positioned on one plane and wherein at least one other port may be positioned on a second plane, wherein the first plane and the second plane may be offset from each other and/or the planes may be perpendicular to a central axis of a mixing tube.

In various exemplary embodiments a mixing head may comprise one, preferably several, for example two or three, main ports (main inlets) through which the liquids forming the basis of the treatment products to be produced enter the mixing head 18. In various exemplary embodiments a mixing head may comprise one, preferably several, for example 4, 8, 24, 48 or 124, further ports (inlets) through which the liquids containing the active ingredients, dyes and/or perfumes of the treatment products to be manufactured enter the mixing head 18. The ports have a diameter of about 1 to 4 mm and/or a length of from about 4 to about 10 mm.

In various exemplary embodiments several, for example two or three mixing heads, can be cascaded, i.e. positioned one behind the other.

In various exemplary embodiments a mixing head may comprise several, for example ten, adapters 17 or hose nozzles and/or the hose nozzles have an M5×3 mm thread. In various exemplary embodiments the adapters 17 may be equipped on one side to be coupled with a hose and/or on another side to be screwed to a collecting device 18 or a mixing head via an M5×3 mm thread.

In various exemplary embodiments two hose nozzles may be connected to a first component and/or eight hose nozzles to a second component of a collection device.

In various exemplary embodiments a mixer may be positioned in a mixing tube and/or a mixer may have a diameter of from about 5 to about 10 mm and a length of from about 35 to about 70 mm.

In various exemplary embodiments the mixing tube may be connected to a collecting device 18 by employing an M8 thread.

In various exemplary embodiments the length of a static mixer or of a mixing tube of the static mixer may be kept as short as possible, so that a cleaning process may be carried out quickly and the consumption of a liquid, which forms the basis of a cosmetic treatment product, can be kept low during a cleaning process.

In various exemplary embodiments the system may comprise a plurality of peristaltic pumps, which may, for example, generate a single delivery pressure in a range from about 300 mbar (millibar) to about 700 mbar, for example in a range from about 400 mbar to about 600 mbar, for example about 500 mbar.

In various exemplary embodiments the system may comprise a plurality of peristaltic pumps, wherein a total discharge pressure generated by the plurality of peristaltic pumps is in a range of, for example, from about 700 mbar to about 1100 mbar, for example, from about 800 mbar to about 1000 mbar.

In various exemplary embodiments the system may be set at least such that by employing the plurality of peristaltic pumps at a collecting chamber of the mixing device an operating pressure of less than about 700 mbar, for example less than about 500 mbar, can be set. In other words, an operating pressure of less than about 700 mbar, e.g. less than about 500 mbar, can be achieved at a point where the plurality of liquids conveyed by the pumps meet.

In various exemplary embodiments a system can be provided in which an operating pressure in the operation of a pump, for example, can be approximately maximum 3 bar, for example maximum 2 bar.

In various exemplary embodiments a static mixer may be provided, in which a plurality of liquids to be mixed based on an operating pressure or on a flow rate of the plurality of peristaltic pumps 10 by flowing along predefined internal elements in the static mixer. In various exemplary embodiments mixing of liquids in the static mixer can be realized based on a flow rate archived in database 3. In various exemplary embodiments the flow rate suitable for a respective liquid or liquid mixture can be read out of a database 3 by employing a computer app on a mobile device 2 and forwarded to system 1 by employing the computer app or by employing the mobile device 2. In various exemplary embodiments the data read from the database 3 can have a mixing ratio for each of the plurality of liquids and a corresponding flow rate for a plurality of peristaltic pumps 10 or can be calibrated to a used static mixer.

In various exemplary embodiments a viscosity of a plurality of viscous liquids can be reduced by applying an operating pressure or shear to a plurality of viscous liquids when conveyed by a plurality of peristaltic pumps during mixing in the mixing device 13. In various exemplary embodiments a viscosity of the liquid can increase again after a liquid to be mixed has passed through the mixing device 13. In other words, during a mixing operation in a static mixer, a liquid that is viscous before mixing, such as a shampoo, conditioner, deep conditioner or hair dye, can change its viscosity to a low viscosity liquid. After the mixing process has been terminated by employing the static mixer, the low viscosity liquid can partially or completely return to its original viscous state in a resting phase. In various exemplary embodiments a mixing device 13 can be provided in such a way that the plurality of liquids can be mixed at a reduced viscosity.

In various exemplary embodiments a system 1 can be provided, which allows a mixing process to be carried out in a low viscosity state of a plurality of liquids. In various exemplary embodiments a system 1 can be provided, which makes it possible that a mixing process can be carried out in a simplified way. In various exemplary embodiments a system 1 can be provided, which enables a mixing process of a plurality of viscous liquids to be carried out more economically or efficiently. In various exemplary embodiments a system 1 can be provided, which makes it possible that a mixing process of viscous liquids can have lower power consumption.

In various exemplary embodiments a system 1 can be provided, in which a hairdresser in a hairdressing salon or a user can determine a condition of hair of a customer, for example a degree of hair damage and/or a current hair color, by employing a sensor, for example an infrared sensor, a camera or a camera housed in a smartphone or tablet. The determined hair condition can, for example, be transmitted by the sensor to a database, where the database contains at least one item of user-specific information, for example a surname of a customer and/or a current hair color of the customer and/or an original natural hair color of a customer and/or a degree of damage to hair of the customer and/or a cosmetic hair treatment agent suitable for the condition of the customer's hair and/or a mixing ratio or composition for the preparation of a cosmetic hair treatment agent designed for the customer, can be stored and can be retrieved from the memory.

In various exemplary embodiments the hairdresser or user, by employing a computer app installed on a mobile device 2, for example a smartphone or a tablet, can enter user-specific data of the customer, for example via a user interface of the computer app. The computer app can be connected to the database 3 via a data transmission connection 5, such as a communication link. By employing the information received from the mobile device 2, a mixing ratio of liquids for the production of a cosmetic treatment product, which is individually tailored to the personal needs of the customer, can be determined or determined based on the transmitted customer-specific information and/or information stored in the database. The determination of the ideal mixing ratio can, for example, be carried out by a computing unit of the database. The determined ideal mixing ratio can be transmitted to the mobile device 2 by employing the data transmission connection 5, for example a data transmission connection, and/or to the system 1 by employing the connection 6, for example a data transmission connection.

The data transmission connection can be for example a WLAN connection, a Wi-Fi connection or a Bluetooth connection, but the data transmission connections mentioned herein are not limited to the data transmission connections mentioned, and other data transmission connections (network protocols) suitable for the transmission of data or information can be realized.

Mobile device 2 can transmit the information regarding the ideal mixing ratio to system 1 via data transmission connection 4. Furthermore, the computer app on the mobile device 2 can be used to enter additional information by the hairdresser, e.g. data on the condition of the hair, which the hairdresser has collected visually and/or haptically. The electronics 8 can receive the corresponding information and/or store it in a memory. Using the received information about an individual mixing ratio, the electronics 8 can control a plurality of peristaltic pumps in such a way that they can transport liquids stored in reservoirs 9 out of the reservoirs. System 1 can be sealed with respect to an external environment. In other words, no air can enter the system from the outside, or liquids cannot escape unintentionally from system 1 components. The liquids from reservoirs 9 can be pumped to a mixing device 13 by employing the pumps via connections 16, for example flexible hoses. Based on a predefined flow rate, the pumps 10 can convey the liquids through hoses, preferably of essentially the same length, to the mixing device 13. The pumps can be set or operated with a flow rate received from database 3, for example, depending on the cosmetic treatment product to be produced or a configuration of the mixer.

In various exemplary embodiments the mixing device 13 may comprise a mixing head 18, a mixing tube 21 and a mixer positioned in the mixing tube. The liquids can be supplied to the mixing head by the operating pressure from the hoses via hose nozzles. In the mixing head, the liquids can pass through nozzles and/or be fed to a chamber 20, for example a mixing chamber. In various exemplary embodiments a number of liquids can pass through a nozzle and/or at least one liquid cannot pass through a nozzle and be fed to chamber 20, as illustrated in FIG. 3*a*. In various exemplary embodiments a liquid which cannot be fed through any nozzle into chamber 20 may comprise a liquid which forms the basis of a cosmetic treatment product. By employing the operating pressure, the plurality of liquids can be conveyed through the mixing tube 21 and the mixer, whereby a mixing of the liquids can be realized by employing internal elements attached to the mixer. A mixture of liquids can be provided at an outlet 22 of the mixing tube 22. The viscous liquids can become less viscous during the mixing process and become viscous liquids again after the mixing process. After the liquids have passed through the mixing device 13, a respective liquid mixture can be filled into a target container 14. Between two filling operations of liquid mixtures, the mixer in the mixing tube can be rinsed with at least one liquid, for example with a liquid which forms the basis of a cosmetic treatment product, for example a shampoo. A liquid which forms the basis of a cosmetic treatment agent can be fed into chamber 20, for example through the mixing head without a nozzle. A liquid used in a cleaning operation to clean the mixer can be collected in a waste device 15. A target container 14 to be filled or filled can be individually printed with a sticker produced by a printer 12 or the printer 12 can individually print at least on one target container 14.

Figure 4:
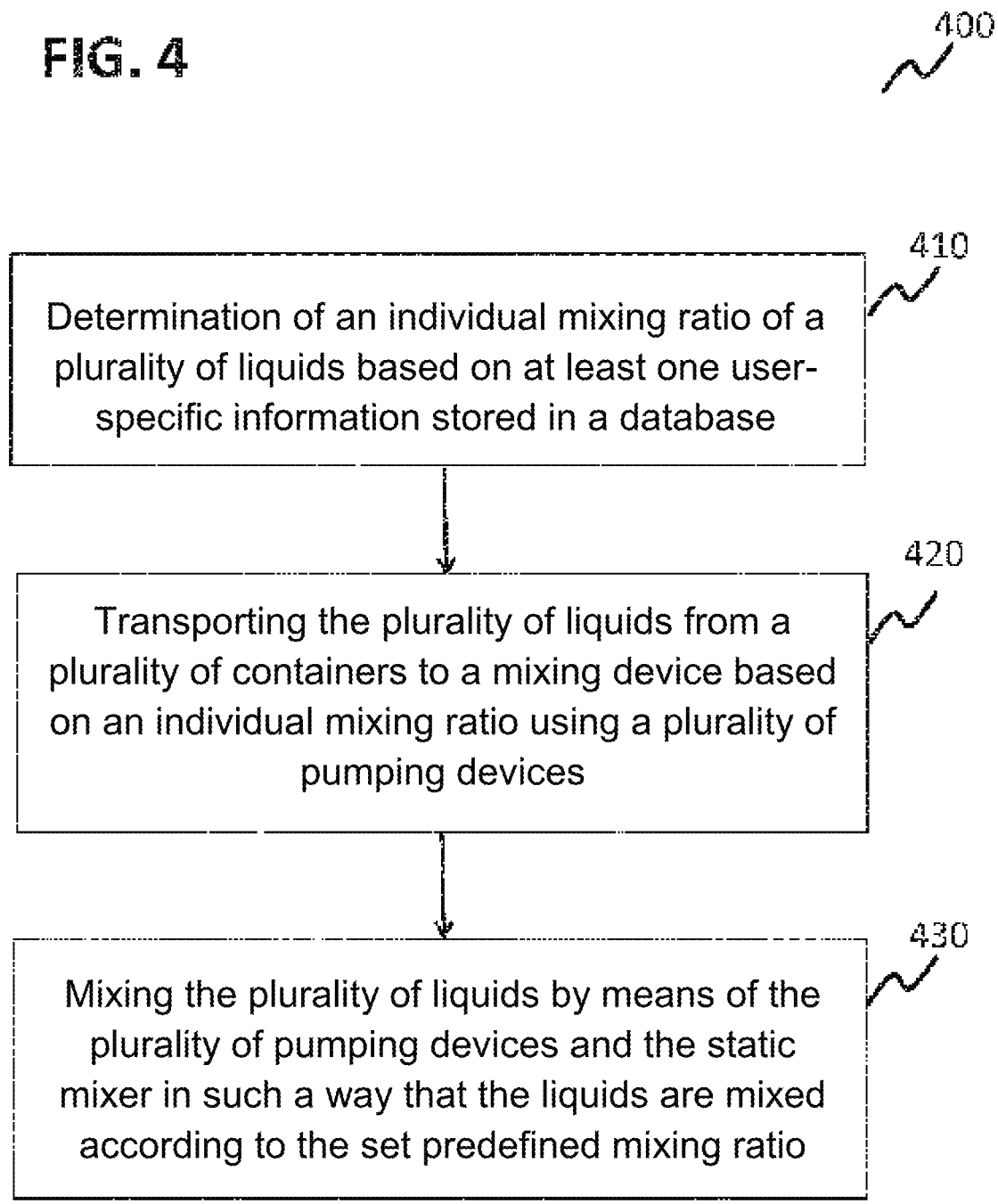
FIG. 4 is a flow chart schematically illustrating a method for producing a liquid mixture according to various exemplary embodiments.

FIG. 4 schematically illustrates a flowchart 400 for generating a liquid mixture according to various exemplary embodiments.

In various exemplary embodiments method 400 may comprise determining a mixing ratio of liquids at least based on predefined data, supplying the plurality of liquids from reservoirs to a mixing device based on the determined mixing ratio by employing at least one pumping device, and mixing the plurality of liquids by employing the mixing device comprising a static mixing device, whereby a viscosity of a liquid is reduced during mixing.

In various exemplary embodiments advantageous designs of the procedures can result from the description of the system and vice versa. In various exemplary embodiments method 400 may further include features described in relation to FIGS. 1, 2, 3 and/or 4.

Various aspects of this disclosure are illustrated below:

Exemplary embodiment 1 is a system for generating a liquid mixture. The system may include at least a plurality of reservoirs, wherein the reservoirs are designed to hold a plurality of viscous liquids; at least one mixing device, wherein the mixing device is designed to mix at least two liquids from the plurality of reservoirs, and wherein the mixing device comprises a static mixer; a plurality of peristaltic pumps, wherein the peristaltic pumps are designed to deliver the liquids from the reservoirs to the mixing device; at least one electronic system, wherein the electronic system is designed to receive at least one item of user-specific information regarding a mixing ratio of the at least two liquids from a computer app on at least one mobile device, and wherein the system is designed to mix the at least two liquids in accordance with the predefined mixing ratio by employing the plurality of peristaltic pumps and the static mixer.

In exemplary embodiment 2, the object of exemplary embodiment 1 may optionally include a suction distance of the liquid between at least one reservoir and a respective associated pump in a predefined smallest possible range.

In exemplary embodiment 3, the object of exemplary embodiment 1 or 2 may optionally include the static mixer further designed to have a length in a range from about 30 mm to about 90 mm, for example from about 35 to about 70 mm.

In exemplary embodiment 4, the object of exemplary embodiment 1 to 3 may optionally include that the mixing device is further designed to comprise a mixing tube, wherein the mixing tube is designed to receive the static mixer with at least four inner elements offset towards each other and/or inner elements twisted by about 180 degrees towards each other and/or wherein the inner elements are positioned offset by about 90 degrees towards a previous inner element.

In exemplary embodiment 5, the object of exemplary embodiment 1 to 4 may optionally include that the mixing device is further designed to mix a plurality of laminar non-Newtonian liquids and/or wherein the laminar non-Newtonian liquids comprise at least one source material of a shampoo, conditioner, deep conditioner or hair dye.

In exemplary embodiment 6 the object of exemplary embodiment 1 to 5 may optionally include a wireless data transmission connection for communication between the electronics and the mobile device.

In exemplary embodiment 7, the object of exemplary embodiment 1 to 6 may optionally include that the information comprises at least one information regarding an individual mixing ratio of a cosmetic hair treatment agent and/or comprises an information regarding a delivery quantity of at least one peristaltic pump suitable for the cosmetic hair treatment agent and/or wherein the information is stored in an external database.

In exemplary embodiment 8, the object of exemplary embodiment 1 to 7 may optionally include that the system is further designed to determine the mixing ratio of the liquids based on at least one previously stored user-specific information in a database.

In exemplary embodiment 9, the object of exemplary embodiment 1 to 8 may optionally include that the plurality of peristaltic pumps are further designed to be coupled to the mixing device by employing fluid lines of equal length.

In exemplary embodiment 10, the object of exemplary embodiment 1 to 9 may optionally include that the mixing device is further designed to perform a cleaning operation, wherein in the cleaning operation a small amount of a liquid from a reservoir cleans the static mixer.

In exemplary embodiment 11, the object of exemplary embodiment 1 to 10 may optionally include that a calculation of the mixing ratio is performed on a remote server or in a cloud and the user-specific information regarding the mixing ratio is transmitted from the server or from the cloud to the computer app.

In exemplary embodiment 12 the object of exemplary embodiment 1 to 11 may optionally include that an individual hair treatment product based on the at least one user-specific information can be reordered for at least one customer.

Exemplary embodiment 13 is a method for generating a liquid mixture. The method may include at least one determination of an individual mixing ratio of at least two liquids of a plurality of liquids based on at least one user-specific information stored in a database; transporting at least two liquids of a plurality of liquids from a plurality of reservoirs to a mixing device based on the determined individual mixing ratio by employing a plurality of pumping devices; and mixing the plurality of liquids by employing the plurality of pumping devices and the static mixer such that the liquids are mixed according to the set predefined mixing ratio.

In exemplary embodiment 14, the object of exemplary embodiment 13 may optionally include receiving from the database the information regarding the individual mixing ratio and/or regarding at least one flow rate of at least one pump used for mixing by employing a computer app on a mobile device and/or by employing a data transmission connection between the mobile device and the database.

In exemplary embodiment 15, the object of exemplary embodiment 13 or 14 may optionally include a determination of the individual mixing ratio based on at least one previously determined user-specific information stored in the database and/or wherein the information comprises at least one information concerning a composition of a shampoo, conditioner, deep conditioner or hair dye.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:
1. System for producing a liquid mixture, comprising:
a plurality of reservoirs, wherein the reservoirs are configured to hold a plurality of viscous liquids;
at least one mixing device, wherein the mixing device is configured to mix at least two liquids from the plurality of reservoirs, and wherein the mixing device comprises a static mixer;
a plurality of peristaltic pumps, wherein the peristaltic pumps are configured to deliver the liquids from the reservoirs to the mixing device;
at least one electronic system, wherein the electronic system is configured to receive at least one piece of user-specific information regarding a mixing ratio of the at least two liquids from a computer application on at least one mobile device,
wherein the system is configured to mix the at least two liquids according to the mixing ratio by employing the plurality of peristaltic pumps and the static mixer,
wherein a suction distance of the liquid is established between at least one reservoir and a respective associated pump in a predefined smallest possible range;
wherein the static mixer is further configured to include a length of from approximately 35 mm to approximately 70 mm;
wherein the mixing device is further configured to comprise a mixing tube, wherein the mixing tube is configured to receive the static mixer with at least four inner elements offset towards each other and/or inner elements twisted by about 180 degrees towards each other and/or wherein the inner elements are positioned offset by about 90 degrees towards a previous inner element;
wherein the mixing device is further configured to mix a plurality of laminar non-Newtonian liquids and/or wherein the laminar non-Newtonian liquids comprise at least one source material of a shampoo, conditioner, deep conditioner or hair dye;
wherein the system further comprises a wireless data transmission connection for communication between the electronic system and the mobile device; and
wherein the information comprises at least one item of information relating to an individual mixing ratio of a cosmetic hair treatment agent and/or comprises information relating to conveying through at least one peristaltic pump suitable for the cosmetic hair treatment agent and/or wherein the information is stored in an external database.

2. System according to claim 1,
wherein the system is further configured to determine the mixing ratio of the liquids based on at least one previously stored user-specific information in a database.

3. System according to claim 1,
wherein the plurality of peristaltic pumps are further configured to be coupled to the mixing device by employing fluid lines of equal length.

4. System according to claim 1,
wherein the mixing device is further configured to perform a cleaning operation, wherein in the cleaning operation an amount of a liquid from a reservoir cleans the static mixer.

5. System according to claim 1,
wherein a calculation of the mixing ratio is performed on a remote server or in a cloud and the user-specific information regarding the mixing ratio is transmitted from the server or from the cloud to the computer application.

6. System according to claim 1,
wherein the system is configured so that an individual hair treatment agent is reordered for at least one customer based on the at least one user-specific information.

7. System for producing a liquid mixture, comprising:
a plurality of reservoirs, wherein the reservoirs are configured to hold a plurality of viscous liquids;
at least one mixing device, wherein the mixing device is configured to mix at least two liquids from the plurality of reservoirs, and wherein the mixing device comprises a static mixer;
a plurality of peristaltic pumps, wherein the peristaltic pumps are configured to deliver the liquids from the reservoirs to the mixing device;
at least one electronic system, wherein the electronic system is configured to receive at least one piece of user-specific information regarding a mixing ratio of the at least two liquids from a computer application on at least one mobile device,
wherein the system is configured to mix the at least two liquids according to the mixing ratio by employing the plurality of peristaltic pumps and the static mixer,
wherein a suction distance of the liquid is established between at least one reservoir and a respective associated pump in a predefined smallest possible range;
wherein the static mixer is further configured to include a length of from approximately 35 mm to approximately 70 mm;
wherein the mixing device is further configured to comprise a mixing tube, wherein the mixing tube is configured to receive the static mixer with at least four inner elements offset towards each other and/or inner elements twisted by about 180 degrees towards each other and/or wherein the inner elements are positioned offset by about 90 degrees towards a previous inner element;
wherein the mixing device is further configured to mix a plurality of laminar non-Newtonian liquids and/or wherein the laminar non-Newtonian liquids comprise at least one source material of a shampoo, conditioner, deep conditioner or hair dye;
wherein the system further comprises a wireless data transmission connection for communication between the electronic system and the mobile device;
wherein the information comprises at least one item of information relating to an individual mixing ratio of a cosmetic hair treatment agent and/or comprises information relating to conveying through at least one peristaltic pump suitable for the cosmetic hair treatment agent and/or wherein the information is stored in an external database;
wherein the system is further configured to determine the mixing ratio of the liquids based on at least one previously stored user-specific information in a database;
wherein the plurality of peristaltic pumps are further configured to be coupled to the mixing device by employing fluid lines of equal length;
wherein the mixing device is further configured to perform a cleaning operation, wherein in the cleaning operation an amount of a liquid from a reservoir cleans the static mixer;
wherein a calculation of the mixing ratio is performed on a remote server or in a cloud and the user-specific information regarding the mixing ratio is transmitted from the server or from the cloud to the computer application; and
wherein the system is configured so that an individual hair treatment agent is reordered for at least one customer based on the at least one user-specific information.

* * * * *